US009261987B2

(12) United States Patent
Rounding et al.

(10) Patent No.: US 9,261,987 B2
(45) Date of Patent: Feb. 16, 2016

(54) METHOD OF SUPPORTING MULTIPLE SELECTIONS AND INTERACTIVE INPUT SYSTEM EMPLOYING SAME

(75) Inventors: Kathryn Rounding, Calgary (CA); David Milford, Calgary (CA); Shih-Chen Man, Calgary (CA); Michael Boyle, Calgary (CA); William Leung, Calgary (CA)

(73) Assignee: SMART Technologies ULC, Calgary (CA)

( * ) Notice: Subject to any disclaimer, the term of this patent is extended or adjusted under 35 U.S.C. 154(b) by 0 days.

(21) Appl. No.: 13/349,243

(22) Filed: Jan. 12, 2012

(65) Prior Publication Data

US 2012/0179977 A1 Jul. 12, 2012

Related U.S. Application Data

(60) Provisional application No. 61/431,853, filed on Jan. 12, 2011, provisional application No. 61/431,848, filed on Jan. 12, 2011.

(51) Int. Cl.
*G06F 3/00* (2006.01)
*G06F 3/048* (2013.01)
*G06F 3/038* (2013.01)
*G06F 3/0484* (2013.01)
*G06F 3/0481* (2013.01)
*G06F 3/0482* (2013.01)

(52) U.S. Cl.
CPC .............. *G06F 3/038* (2013.01); *G06F 3/0481* (2013.01); *G06F 3/0484* (2013.01); *G06F 3/0482* (2013.01)

(58) Field of Classification Search
CPC ..... G09B 5/00; H04L 12/1822; G06F 3/0481; G06F 3/0482; G06F 3/0484; G06F 3/038
USPC .......... 715/750, 751, 754, 815, 826; 345/650, 345/676, 661, 619, 173, 174, 156–158
See application file for complete search history.

(56) References Cited

U.S. PATENT DOCUMENTS

| 5,448,263 | A | 9/1995 | Martin |
| 5,659,693 | A | 8/1997 | Hansen et al. |
| 6,057,836 | A | 5/2000 | Kavalam et al. |
| 6,141,000 | A | 10/2000 | Martin |
| 6,337,681 | B1 | 1/2002 | Martin |
| 6,498,590 | B1 * | 12/2002 | Dietz et al. ..................... 343/893 |
| 6,498,602 | B1 * | 12/2002 | Ogawa .......................... 345/173 |

(Continued)

OTHER PUBLICATIONS

Transmittal; International Search Report; and Written Opinion of the International Searching Authority for International Application No. PCT/CA2012/000027 with a mailing date of Mar. 23, 2012.

(Continued)

*Primary Examiner* — Kieu Vu
*Assistant Examiner* — Asteway T Gattew
(74) *Attorney, Agent, or Firm* — Katten Muchin Rosenman LLP

(57) ABSTRACT

A method comprises receiving an input event associated with a first user ID, the input event being a command for selecting at least one graphic object; determining if a selection is currently associated with the first user ID; and if no selection is currently associated with the first user ID creating a first selection; associating the first selection with the first user ID; and including the selected at least one graphic object in the first selection.

44 Claims, 7 Drawing Sheets

(56) References Cited

U.S. PATENT DOCUMENTS

| | | | |
|---|---|---|---|
| 6,624,831 | B1 | 9/2003 | Shahine et al. |
| 6,747,636 | B2 | 6/2004 | Martin |
| 6,803,906 | B1 | 10/2004 | Morrison et al. |
| 7,232,986 | B2 | 6/2007 | Worthington et al. |
| 7,236,162 | B2 | 6/2007 | Morrison et al. |
| 7,274,356 | B2 | 9/2007 | Ung et al. |
| 7,532,206 | B2 | 5/2009 | Morrison et al. |
| 7,577,922 | B2 | 8/2009 | Mann et al. |
| 8,402,391 | B1 * | 3/2013 | Doray et al. ............... 715/834 |
| 2002/0101418 | A1 * | 8/2002 | Vernier et al. ............... 345/418 |
| 2004/0179001 | A1 | 9/2004 | Morrison et al. |
| 2005/0183035 | A1 * | 8/2005 | Ringel et al. ............... 715/811 |
| 2007/0075982 | A1 | 4/2007 | Morrison et al. |
| 2007/0291008 | A1 * | 12/2007 | Wigdor et al. ............... 345/173 |
| 2009/0225040 | A1 * | 9/2009 | Whytock ............... 345/173 |
| 2010/0033549 | A1 * | 2/2010 | Sato ............... 348/14.08 |
| 2010/0079369 | A1 * | 4/2010 | Hartmann et al. ............ 345/156 |
| 2010/0079493 | A1 * | 4/2010 | Tse et al. ............... 345/650 |
| 2010/0083109 | A1 * | 4/2010 | Tse et al. ............... 715/702 |
| 2010/0205190 | A1 | 8/2010 | Morris et al. |
| 2011/0087999 | A1 * | 4/2011 | Bichsel et al. ............... 715/845 |
| 2011/0169736 | A1 | 7/2011 | Bolt et al. |
| 2011/0175827 | A1 * | 7/2011 | Bogue ............... 345/173 |
| 2011/0270824 | A1 * | 11/2011 | Morris et al. ............... 707/722 |

OTHER PUBLICATIONS

Extended European Search Report for European Patent Application No. 12 734 245.9 with a mailing date of Jul. 3, 2014.

* cited by examiner

METHOD OF SUPPORTING MULTIPLE SELECTIONS AND INTERACTIVE INPUT SYSTEM EMPLOYING SAME

CROSS-REFERENCE TO RELATED APPLICATIONS

This application claims the benefit of U.S. Provisional Application No. 61/431,853 entitled "METHOD FOR SUPPORTING MULTIPLE MENUS AND INTERACTIVE INPUT SYSTEM EMPLOYING SAME", filed on Jan. 12, 2011, the content of which is incorporated herein by reference in its entirety. This application is also related to U.S. Provisional Application No. 61/431,848 entitled "METHOD FOR SUPPORTING MULTIPLE MENUS AND INTERACTIVE INPUT SYSTEM EMPLOYING SAME" filed on Jan. 12, 2011, the content of which is incorporated herein by reference in its entirety.

FIELD OF THE INVENTION

The present invention relates generally to interactive input systems and in particular, to a method and apparatus for supporting multiple selections and an interactive input system employing same.

BACKGROUND OF THE INVENTION

Interactive input system's that allow users to inject input (i.e., digital ink, mouse events etc.) into an application program using an active pointer (e.g., a pointer that emits light, sound or other signal), a passive pointer (e.g., a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001, all assigned to SMART Technologies ULC of Calgary, Alberta, Canada, assignee of the subject application, the entire contents of which are incorporated herein by reference; touch systems comprising touch panels employing electromagnetic, capacitive, acoustic or other technologies to register pointer input; laptop and tablet personal computers (PCs); personal digital assistants (PDAs) and other handheld devices; and other similar devices.

Above-incorporated U.S. Pat. No. 6,803,906 to Morrison et al., discloses a touch system that employs machine vision to detect a pointer interaction with a touch surface on which a computer-generated image is presented. A rectangular bezel or frame surrounds the touch surface and supports digital cameras at its corners. The digital cameras have overlapping fields of view that encompass and look generally across the touch surface. The digital cameras acquire images from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x, y) coordinates relative to the touch surface using triangulation. The pointer coordinates are conveyed to a computer executing one or more application programs. The computer uses the pointer location data to update the computer-generated image that is presented on the touch surface. Pointer contacts on the touch surface can therefore be recorded as writing or used to control execution of an application program executed by the computer.

Interactive systems such as those referred to above enable interactive presentations and collaborations. A presenter typically uses a pointer such as a finger or a pen, to select and manipulate displayed graphic objects. The user may add annotations, change colors or fill patterns of graphic objects; and/or move, rotate, enlarge, reduce and generally manipulate displayed graphic objects using certain gestures.

Touch based interactive input systems are sometimes operated by multiple users for collaborative purposes. However, application programs for use with interactive input systems are typically designed with a single user in mind. For example, when two or more users operate a single interactive input system at the same time, a graphic object selected by a first user may be inadvertently de-selected, manipulated or even deleted by a second user making another selection. Such object selectivity may disrupt collaboration between the users.

Improvements are therefore generally desired. Accordingly, it is an object to provide a novel method and apparatus for supporting multiple selections and a novel interactive input system employing same.

SUMMARY OF THE INVENTION

Accordingly, in one aspect, there is provided a method comprising receiving an input event associated with a first user ID, the input event being a command for selecting at least one graphic object; determining if a selection is currently associated with the first user ID; and if no selection is currently associated with the first user ID creating a first selection; associating the first selection with the first user ID; and including the selected at least one graphic object in the first selection.

In one embodiment, the method further comprises receiving an input associated with a second user ID, the input event being a command for selecting at least one graphic object, determining if a selection is currently associated with the second user ID and if no selection is currently associated with the second user ID, creating a second selection, associating the second selection with the second user ID and including the selected at least one graphic object in the second selection.

In another embodiment, the method further comprises if an existing selection is currently associated with the first user ID, and the input event is a command for creating a new selection, clearing the existing selection, creating the new selection and including the selected at least one graphic object in the new selection. If an existing selection is currently associated with the first user ID and the input event is not a command for creating a new selection, the method further comprises including the selected at least one graphic object in the existing selection.

The first and/or second selection may be manipulatable only by an input source associated with the first user ID and/or the second user ID. The first and/or second selection may be one of resizing, moving and rotating. The at least one graphic object may be one of a shape object, text object, ink object and animation object. The first user ID may be based on an input ID and a surface ID.

In another embodiment, the method may further comprise altering a visual property of the at least one selected graphic object to indicate membership in the first and/or second selections. The altered visual properties of the first and second selections may be different.

According to another aspect, there is provided an interactive input system comprising at least one interactive surface; and processing structure in communication with the interactive surface and being configured to generate an input event associated with a first user ID, the input event being a command for selecting at least one graphic object shown on the interactive surface; determine if a selection is currently associated with the first user ID; and if no selection is currently associated with the first user ID create a first selection; associate the first selection with the first user ID; and include the selected at least one graphic object in the first selection.

According to yet another aspect, there is provided a non-transitory computer-readable medium having embodied thereon a computer program comprising instructions which, when executed by processing structure, carry out the steps of receiving an input event associated with a first user ID, the input event being a command for selecting at least one graphic object; determining if a selection is currently associated with the first user ID; and if no selection is currently associated with the first user ID creating a first selection; associating the first selection with the first user ID; and including the selected at least one graphic object in the first selection.

According to still yet another aspect, there is provided an apparatus comprising processing structure; and memory storing program code, which when executed by the processing structure, causes the processing structure to direct the apparatus to in response to receiving an input event associated with a first user ID, the input event being a command for selecting at least one graphic object, determine if a selection is currently associated with the first user ID; and if no selection is currently associated with the first user ID create a first selection; associate the first selection with the first user ID; and include the selected at least one graphic object in the first selection.

BRIEF DESCRIPTION OF THE DRAWINGS

Embodiments will now be described more fully with reference to the accompanying drawings in which.

DETAILED DESCRIPTION OF THE INVENTION

In the following a method and apparatus for supporting multiple user selections are described. The method comprises receiving an input event associated with a first user ID, the input event being a command for selecting at least one graphic object; determining if a selection is currently associated with the first user ID; and if no selection is currently associated with the first user ID, creating a first selection, associating the first selection with the first user ID, and including the selected at least one graphic object in the first selection.

Figure 1:
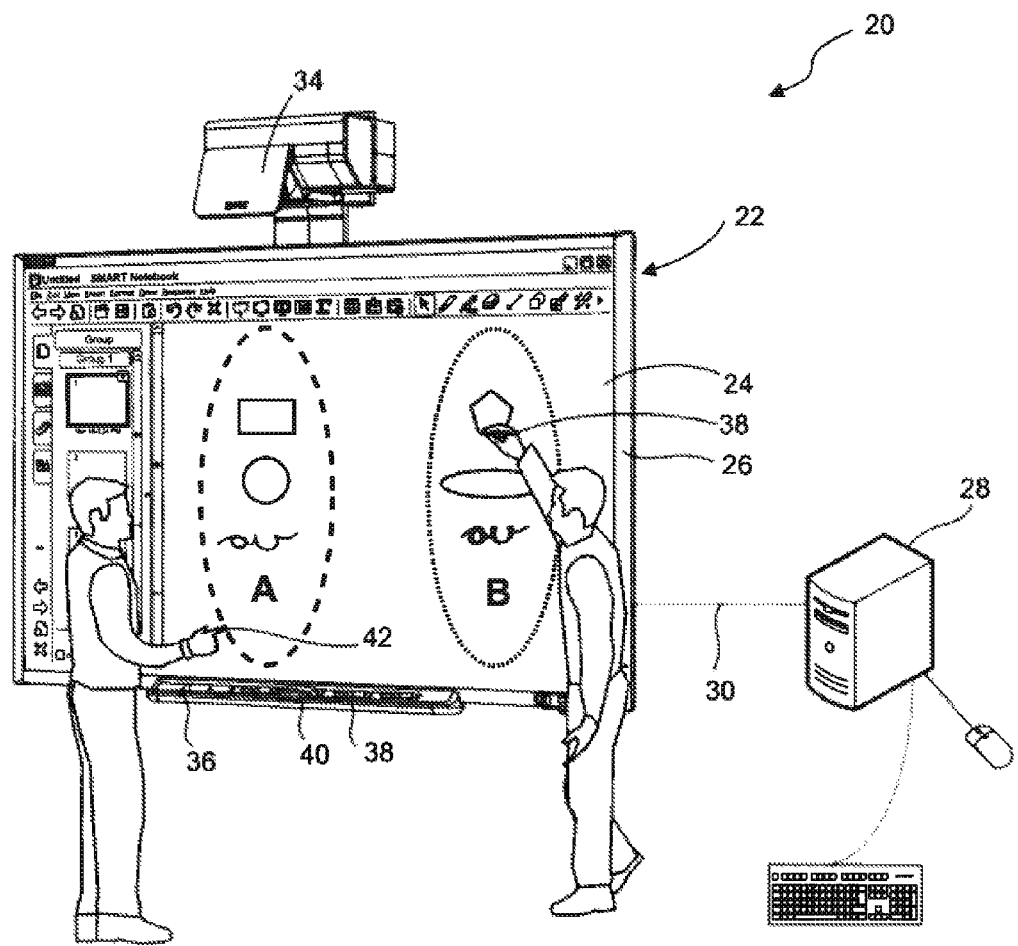
FIG. 1 is a perspective view of an interactive input system.

Turning now to FIG. 1, an interactive input system is shown and is generally identified by reference numeral 20. Interactive input system 20 allows one or more users to inject input such as digital ink, mouse events, commands, etc., into an executing application program. In this embodiment, interactive input system 20 comprises a two-dimensional (2D) interactive device in the faun of an interactive whiteboard (IWB) 22 mounted on a vertical support surface such as for example, a wall surface or the like. IWB 22 comprises a generally planar, rectangular interactive surface 24 that is surrounded about its periphery by a bezel 26. An ultra-short-throw projector 34 such as that sold by SMART Technologies ULC of Calgary, Alberta, Canada under the name "SMART UX60", is also mounted on the support surface above the IWB 22 and projects an image, such as for example, a computer desktop, onto the interactive surface 24.

The IWB 22 employs machine vision to detect one or more pointers brought into a region of interest in proximity with the interactive surface 24. The IWB 22 communicates with a general purpose computing device 28 executing one or more application programs via a universal serial bus (USB) cable 30 or other suitable wired or wireless communication link. Computing device 28 processes the output of the IWB 22 and adjusts image data that is output to the projector 34, if required, so that the image presented on the interactive surface 24 reflects pointer activity. In this manner, the IWB 22, computing device 28 and projector 34 allow pointer activity proximate to the interactive surface 24 to be recorded as writing or drawing or used to control execution of one or more application programs executed by the computing device 28.

The bezel 26 is mechanically fastened to the interactive surface 24 and comprises four bezel segments that extend along the edges of the interactive surface 24. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the interactive surface 24.

A tool tray 36 is affixed to the IWB 22 adjacent the bottom bezel segment using suitable fasteners such as for example, screws, clips, adhesive etc. As can be seen, the tool tray 36 comprises a housing having an upper surface configured to define a plurality of receptacles or slots. The receptacles are sized to receive one or more pen tools 38 as well as an eraser tool 40 that can be used to interact with the interactive surface 24. Control buttons are also provided on the upper surface of the tool tray housing to enable a user to control operation of the interactive input system 20. Further specifies of the tool tray 36 are described in U.S. Patent Application Publication No. 2011/0169736 to Bolt et al., filed on Feb. 19, 2010, and entitled "INTERACTIVE INPUT SYSTEM AND TOOL TRAY THEREFOR".

Imaging assemblies (not shown) are accommodated by the bezel 26, with each imaging assembly being positioned adjacent a different corner of the bezel. Each of the imaging assemblies comprises an image sensor and associated lens assembly. The lens has an IR pass/visible light blocking filter thereon and provides the image sensor with a field of view sufficiently large as to encompass the entire interactive surface 24. A digital signal processor (DSP) or other suitable processing device sends clock signals to the image sensor causing the image sensor to capture image frames at the desired frame rate. During image frame capture, the DSP also causes an infrared (IR) light source to illuminate and flood the region of interest over the interactive surface 24 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes reflected IR illumination and appears as a dark region interrupting the bright band in captured image frames.

The imaging assemblies are oriented so that their fields of view overlap and look generally across the entire interactive surface 24. In this manner, any pointer such as for example a user's finger 42, a cylinder or other suitable object, a pen tool 38 or an eraser tool 40 lifted from a receptacle of the tool tray 36, that is brought into proximity of the interactive surface 24 appears in the fields of view of the imaging assemblies and thus, is captured in image frames acquired by multiple imaging assemblies. When the imaging assemblies acquire image frames in which a pointer exists, the imaging assemblies convey pointer data to the computing device 28.

The general purpose computing device 28 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computer components to the processing unit. The computing device 28 may also comprise networking capabilities using Ethernet, WiFi, and/or other suitable network format, to enable connection to shared or remote drives, one or more networked computers, or other networked devices. A keyboard and a mouse are also coupled to the general purpose computing device 28.

The computing device 28 processes pointer data received from the imaging assemblies to reject pointer ambiguity by combining the pointer data detected by the imaging assemblies, and to compute the locations of pointers proximate the interactive surface 24 using well known triangulation. The computed pointer locations are then recorded as writing or drawing or used as one or more input commands to control execution of an application program as described above.

In addition to computing the locations of pointers proximate the interactive surface 24, the general purpose computing device 28 also determines the pointer types (e.g., a pen tool, a finger or a palm) by using pointer type data received from the IWB 22. The pointer type data is generated for each pointer contact point by the DSP of least one of the imaging assemblies. The pointer type data is generated by differentiating a curve of growth derived from a horizontal intensity profile of pixels corresponding to each pointer tip in the captured image frames. Specifics of methods used to determine pointer type are described in U.S. Pat. No. 7,532,206 to Morrison, et al., and assigned to SMART Technologies ULC, Calgary, Alberta, Canada, the assignee of the subject patent application, the content of which is incorporated herein by reference in its entirety.

Figure 2:
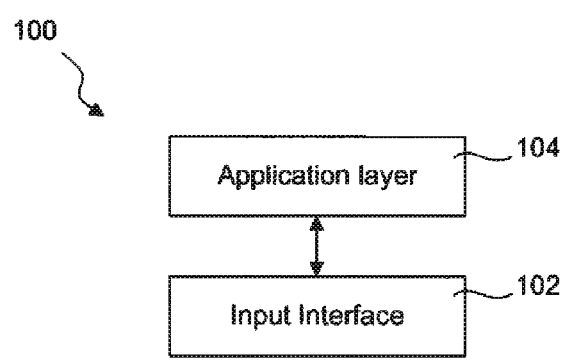
FIG. 2 is a block diagram of a software architecture used by the interactive input system of FIG. 1.

FIG. 2 shows the software architecture used by the interactive input system 20, and which is generally identified by reference numeral 100. The software architecture 100 comprises an input interface 102, and an application layer 104 comprising an application program. The input interface 102 is configured to receive input from various input sources generated from the input devices of the interactive input system 20. In this embodiment, the input devices include the IWB 22, the mouse, and the keyboard. The input interface 102 processes each input received and generates an input event. In generating each input event, the input interface 102 generally detects the identity of the input received based on input characteristics, and assigns to each input event an input ID and a surface ID.

The input ID identifies the input source. If the input originates from the mouse or the keyboard, the input ID identifies that input device. If the input is pointer input originating from the IWB 22, the input ID identifies the type of pointer, such as for example a pen tool, a finger or a palm. In this case, the surface ID identifies the interactive surface on which the pointer input is received. In this embodiment, IWB 22 comprises only a single interactive surface, namely interactive surface 24.

The input interface 102 also associates each input event to a respective user ID. In this embodiment, the user ID is assigned based on both the input ID and the surface ID. For example, a pen tool and a finger contacting the interactive surface 24 at the same time will be assigned different user IDs. As another example, two fingers contacting the interactive surface 24 at the same time will be assigned the same user ID, even though they have different contact coordinates. Once an input event has been generated, the input interface 102 communicates the input event and the user ID to the application program.

Figure 3:
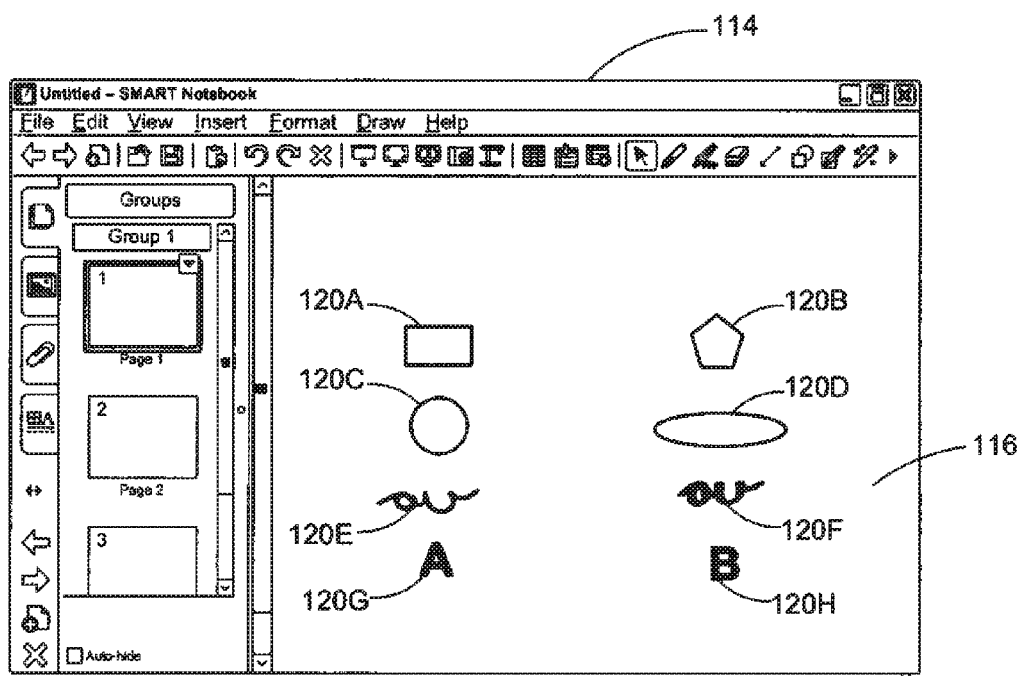
FIG. 3 is an application program window presented by the interactive input system of FIG. 1.

FIG. 3 shows an application program window presented by the interactive input system 20 and displayed on the IWB 22, and which is generally referred to by reference numeral 114. Application program window 114 is a graphical user interface associated with application program which, in this embodiment, is the SMART Notebook™ offered by SMART Technologies ULC of Calgary, Alberta, Canada. In the embodiment shown, application program window 114 comprises a drawing area 116 in which a plurality of graphic objects are displayed. The graphic objects displayed are shape objects 120A to 120D, digital ink objects 120E and 120F, and text objects 120G and 120H.

Each of the graphic objects 120A to 120H is assigned a respective object ID by the application program. For graphic objects 120A to 120H shown in FIG. 3, the set of object IDs has the form:

(object_0, object_1, object_2, . . . , object_7).

Each of the graphic objects 120A to 120H displayed in the drawing area 116 of the application program window 114 is selectable through pointer input with the interactive surface 24. When one or more graphic objects 120A to 120H are selected, the application program creates a selection having a unique selection ID.

Selected graphics objects are associated with the selection ID. This association has the form:

[object ID, selection ID].

As will be understood, a selection of one or more graphic objects 120A to 120H can be made by a user in a variety of ways. For example, a single graphic object can be selected by clicking on or touching the graphic object using a pointer. One or more graphic objects can be selected by clicking on or touching graphic objects while holding down the SHIFT or CTRL key on a keyboard, or by using a marquee selection action. The marquee selection action involves positioning and holding down a pointer to create a transparent bounding box, and then expanding the box by moving the pointer to enclose the desired graphic objects. Lifting the pointer completes the selection of the enclosed graphic objects. In some alternative embodiments, one or more graphic objects can also be selected by drawing a shape encircling desired graphic objects, and then designating the shape as an enclosure of a group for selection.

The graphic objects 120A to 120H may also be selected using gestures. For example, one or more graphic objects may be selected by making a bracketing motion using pointers, such as two fingers or the inner palm edges of two hands, around the one or more graphic objects. As another example, one or more graphic objects may be simultaneously selected using a "grabbing" motion with all fingers of a hand. Those of skill in the art will recognize that still other approaches may be used for selecting one or more graphic objects.

Figure 4:
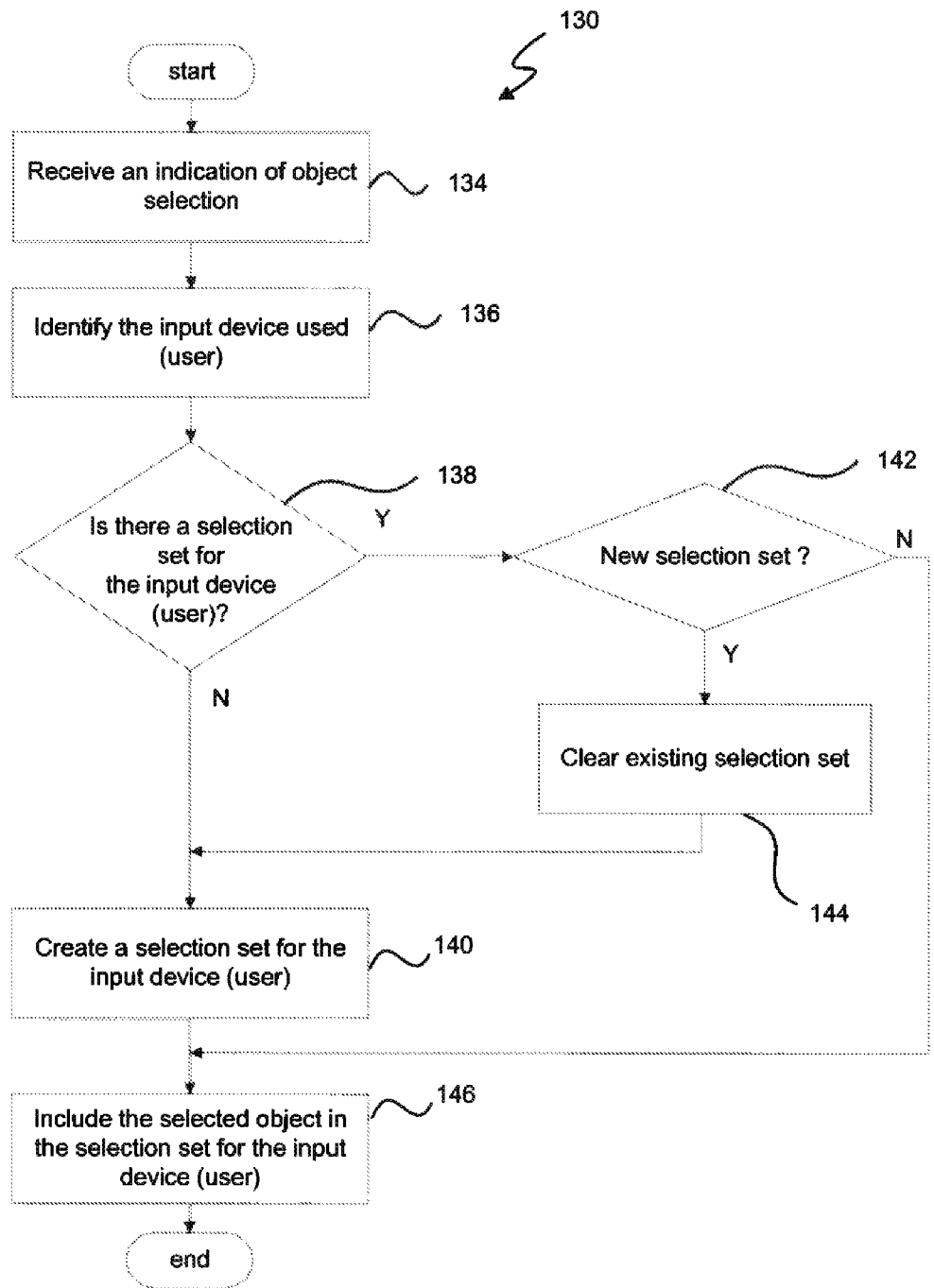
FIG. 4 is a flowchart showing the steps of a multiple selection support process used by the interactive input system of FIG. 1.

To allow multiple users to create and manipulate a respective selection, and without interfering with each others associated selection, the interactive input system 20 utilizes a multiple selection support process, which is shown in FIG. 4 and is generally referred to by reference numeral 130. In this embodiment, the multiple selection support process 130 is carried out by the computing device 28. The input interface 102 comprises a SMART Board driver offered by SMART Technologies ULC of Calgary, Alberta, Canada.

As shown in FIG. 4, multiple selection support process 130 starts when the application program detects an input event for a given user ID, where the input event corresponds to a command for object selection (step 134). Upon detection of the selection input event, the application program obtains the user ID associated with the selection input event (step 136). The application program then determines if a selection ID is currently associated with the user ID (step 138). If no selection ID is currently associated with the user ID, the process proceeds to step 140.

If it is determined at step 138 that a selection ID is currently associated with the user ID, the application program then determines if the input event further corresponds to a command for creating a new selection (step 142). If the selection event further corresponds to a command for creating a new selection, any existing selection ID associated with the user ID is deleted (step 144), and the process proceeds to step 140. If it is determined at step 142 that the input event does not further correspond to a command for creating a new selection, the process proceeds to step 146.

At step 140, the application program creates a selection with a new selection ID and associates the selection ID with the user ID. The object IDs of any objects selected in the selection event are then associated with the new selection ID (step 146). The process 130 then ends.

As will be understood, the application program allows multiple selections to be created either simultaneously or consecutively in any order. For example, a first user may complete the creation of a first selection using a finger and subsequently, a second user may create a second selection using a pen tool. Both selections will stay active, and regardless of the sequence in which they were created. Unlike prior art methods, the creation of a second selection does not deselect or cancel the first selection. The application program similarly allows multiple selections to be manipulated simultaneously or consecutively in any order.

Figure 5:
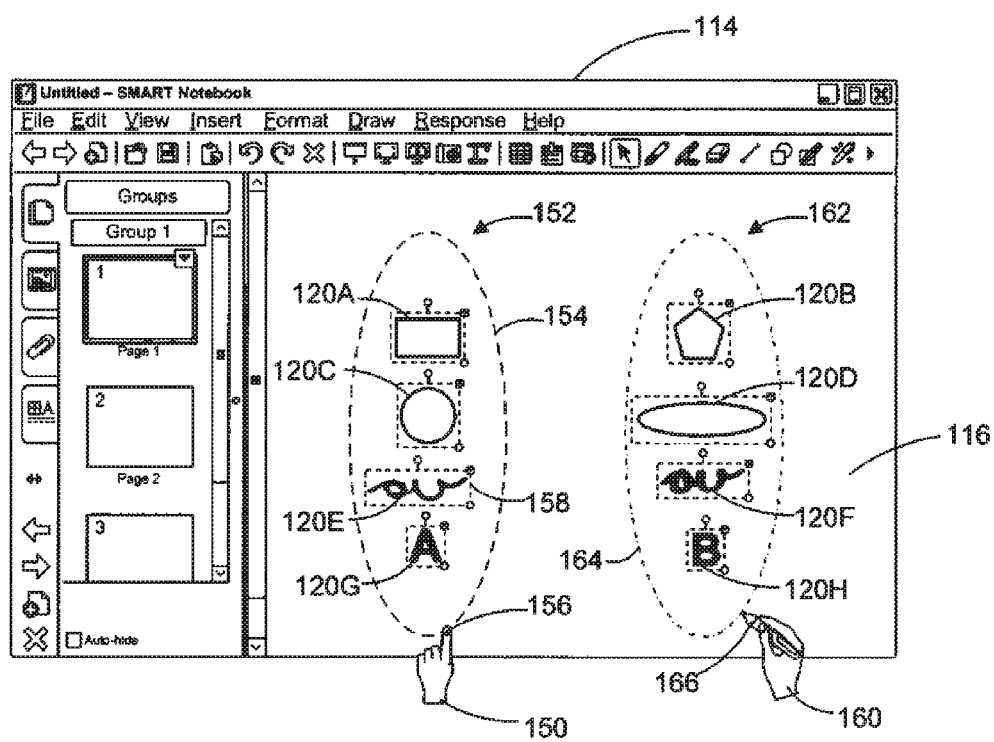
FIG. 5 is the application program window of FIG. 3, having been updated following multiple selections.

FIG. 5 shows the application program window 114 updated after multiple selections have been created using the multiple selection support process 130. In the embodiment shown, a first user 150 has made a selection 152 by drawing a marquee selection shape 154 enclosing the graphic objects 120A, 120C, 120E and 120G using a finger 156. Accordingly, the application program has associated each of the graphic objects 120A, 120C, 120E and 120G with a first selection ID, and has associated the first selection ID with the user ID associated with finger 156.

A second user 160 has made a selection 162 by drawing a marquee selection shape 164 enclosing the graphic objects 120B, 120D, 120F and 120H using a pen tool 166. Accordingly, the application program has associated each of the graphic objects 120B, 120D, 120F and 120H with a second selection ID, and has associated the second selection ID with the user ID associated with pen tool 166.

Once selected, a visual property of each graphic object is altered to indicate membership in the selection. In this embodiment, this alteration is in the form of an enclosing perimeter box such as box 158 having a handle.

The [object ID, selection ID] associations of the selected graphic objects shown in FIG. 5 are listed in Table 1, below. The values of object ID and selection ID are equivalent to the reference numerals used to represent the graphic objects in the above paragraphs and in FIG. 5:

TABLE 1

| Object ID | Selection ID |
|---|---|
| 120A | 152 |
| 120B | 162 |
| 120C | 152 |
| 120D | 162 |
| 120E | 152 |
| 120F | 162 |
| 120G | 152 |
| 120H | 162 |

The [selection ID, User ID] associations of the embodiment shown in FIG. 5 are listed in Table 2, below. Again, the values of user ID are equivalent to the reference numerals used to represent the pointers in the above paragraphs and in FIG. 5:

TABLE 2

| selection ID | User ID |
|---|---|
| 152 | 156 |
| 162 | 166 |

A user operating an input source associated with a given user ID can directly manipulate the selection associated with that user ID. Such manipulation may take the form of, for example, resizing, moving or rotating the selection or the graphic objects contained therein.

Advantageously, users can also share common controls such as toolbars, menu-bars, 'Properties' tabs, context menus and the like, to indirectly manipulate their own selections (i.e., associated with their user ID) without affecting selections that belong to others (i.e., associated with other user IDs). Such indirect manipulation may take the form of, for example, selecting some text box objects in a selection, and then using a shared text formatting toolbar, to change the font of the text therein to bold, italic, or underlined font. In addition, to indirectly manipulate shape objects (e.g., circles, squares, polygons, etc.) contained in the user's selection, each user may utilize a shared toolbar to change colors, fill patterns, line widths, delete objects, or the like—but only for the those objects belonging to selections associated with the user ID, without affecting the objects in selections associated with other user IDs. Specifics of a multiple menu support method are disclosed in the above-incorporated U.S. Provisional Application No. 61/431,848.

As will be understood, provided each user operates his/her pointer consistently, and without transfer between users, the user ID associated with each pointer may be used to effectively identify the individual user utilizing the pointer.

Figure 6A:
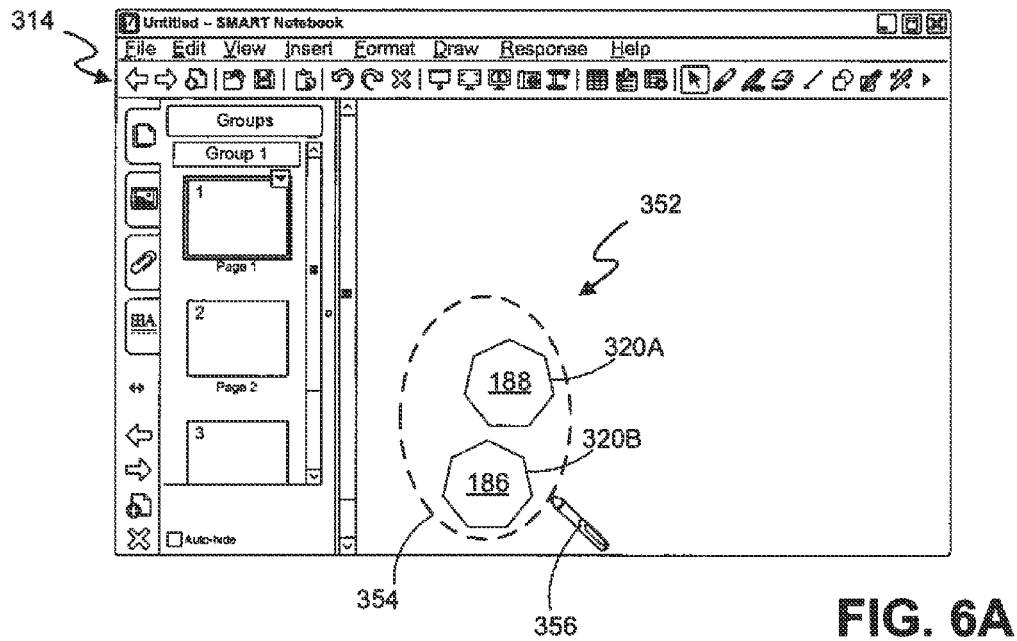
FIGS. 6A and 6B illustrate another embodiment of an application program window presented by the interactive input system of FIG. 1, showing transfer of ownership of a selection.

In the embodiments described above, a selection and all graphic objects in a selection are associated with a user ID that is associated with the input source making the selection. However, in other embodiments, ownership of the selection and graphic objects therein may be transferred from one user ID to another. For example, FIG. 6A shows an application program window 314 in which a user has made a selection 352 by drawing a shape 354 with a pen tool 356 encircling graphic objects 320A and 320B. Accordingly, the application program has associated each of the graphic objects 320A and 320B with a first selection ID of the selection 352, and has associated the selection ID of the selection 352 with the user ID of pen tool 356.

Figure 6B:
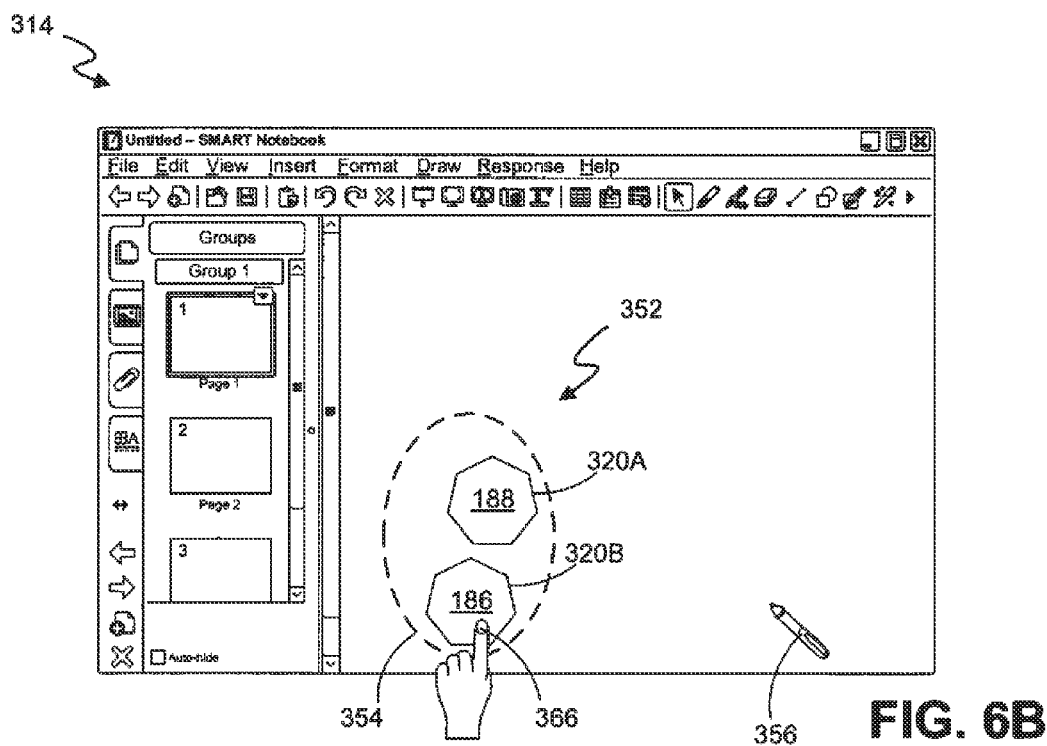

It may be desirable to change the ownership of the selection 352 from the pen tool 356 to another user ID. In this embodiment, ownership of the selection is changed by touching either the selection or the selected graphic objects with a pointer having a different user ID. FIG. 6B shows the application program window 314 updated after a user has contacted graphic object 320B using a finger 366. Following this action, the application program obtains the current selection ID of the selection 352 by querying the association table [object ID, selection ID].

In this embodiment, the values of object ID and selection ID are equivalent to the reference numerals used to represent the graphic objects and selections in the above paragraphs and in FIG. 6. Querying the association table [object ID, selection ID] retrieves the entry:

(object ID=320B, selection ID=352).

Once the selection ID has been retrieved, the existing owner is retrieved by querying the [selection ID, user ID] association table. Here, the query retrieves the entry:

(selection ID=352, user ID=356).

This entry is then updated by the application program to reflect the User ID of the finger, as:

(selection ID=352, user ID=366).

The ownership of the graphic object is thereby transferred by the update. In this embodiment, the ability to transfer ownership is a configurable feature that may be toggled on or off.

Figure 7:
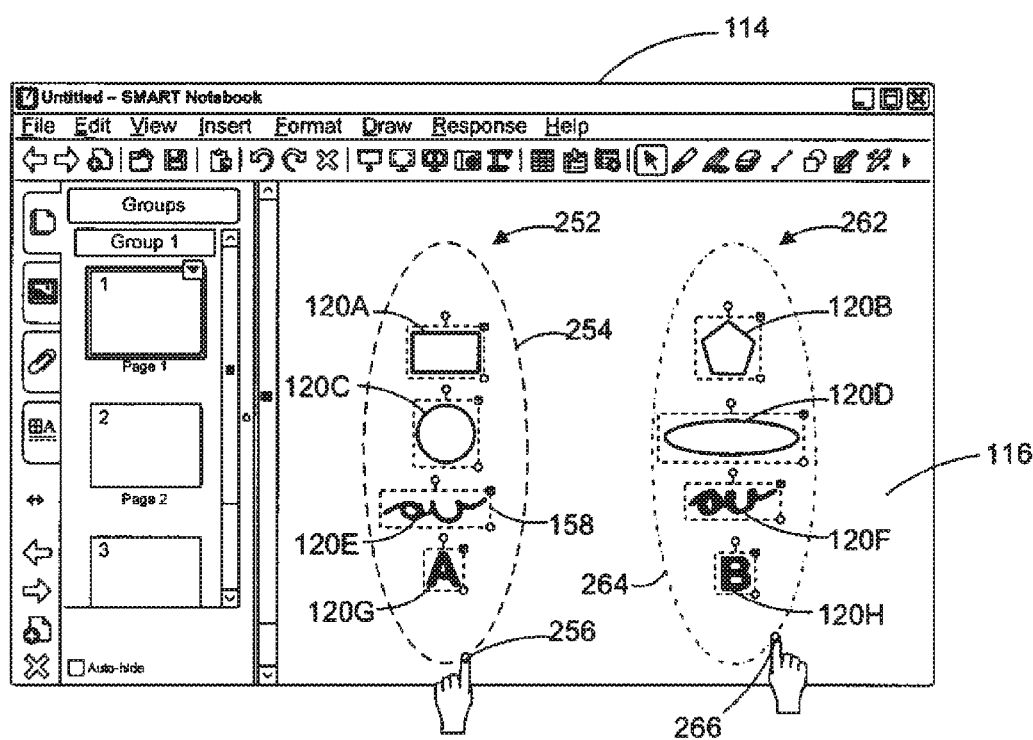
FIG. 7 is the application program window of FIG. 3, having been updated following multiple selections by two pointers of the same type.

In another embodiment, a single user may create two or more selections simultaneously. For example, FIG. 7 shows the application program window 114 updated after selections have been made by a single user operating two similar pointers. In this example, the two pointers are the index fingers 256 and 266 of the user's left and right hands, respectively. In this embodiment, the user has made a selection 252 by drawing a marquee selection shape 254 enclosing the graphic objects 120A, 120C, 120E and 120G using finger 256, and has made a selection 262 by drawing a marquee selection shape 264 enclosing the graphic objects 120B, 120D, 120F and 120H using finger 266. Although fingers 256 and 266 are pointers of the same type, and therefore have the same user ID, the selection events resulting from contacts made by fingers 256 and 266 are distinguishable by the IWB 22 due to the different contact locations of each pointer. Accordingly, each selection is assigned a unique selection ID, but are both associated with a common user ID, as each pointer has the same user ID.

Although in embodiments described above, the IWB comprises a single interactive surface, in other embodiments, the IWB may alternatively be partitioned into two or more interactive surfaces.

Figure 8:
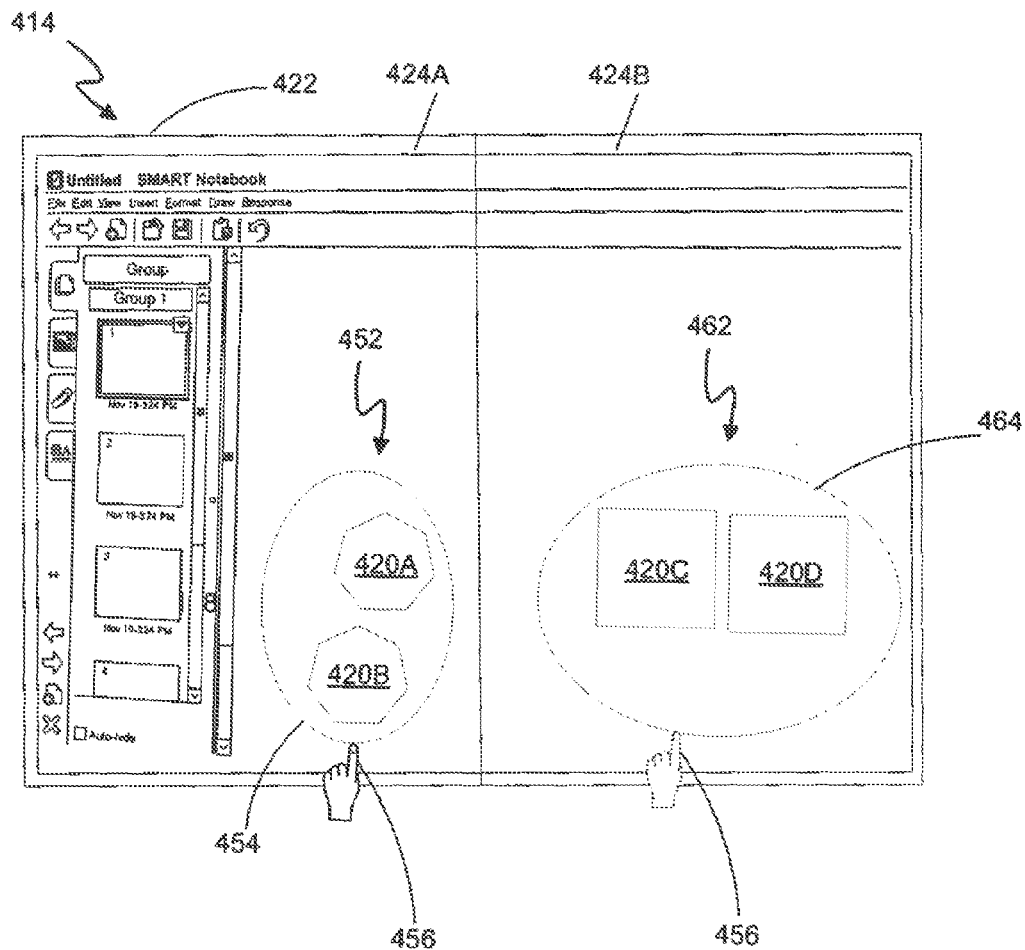
FIG. 8 illustrates yet another embodiment of an application program window presented by the interactive input system of FIG. 1.

For example, FIG. 8 shows another embodiment of an application program window presented by the interactive input system 20, and which is generally referred to by reference numeral 414. Application program window 414 is a graphical user interface associated with the application program which, in this embodiment, is SMART Notebook™ offered by SMART Technologies ULC of Calgary, Alberta, Canada. Application program window 414 is displayed on an IWB 422 comprising two interactive surfaces 424A and 424B.

The input interface 102 processes input received from both interactive surfaces 424A and 424B of the IWB 422 and generates input events. In generating each input event, it provides the input ID and the surface ID. The surface ID uniquely identifies the interactive surface 424A or 424B on which the input is received. As will be understood, by assigning a respective surface ID to input received on each interactive surface 424A and 424B, the same input source (e.g., a finger) may be used to generate input on both interactive surfaces 424A and 424B. In the embodiment shown in FIG. 8, a user has made a selection 452 by drawing a marquee selection shape 454 enclosing the graphic objects 420A and 420B using a finger 456, and has made a selection 462 by drawing a marquee selection shape 464 enclosing the graphic objects 420C and 420D using the same finger 456.

In a related embodiment, the interactive input system may alternatively comprise two or more separate interactive whiteboards (IWBs) connected by a network. In this case, an input interface is in communication with all IWBs, and processes input received from the IWBs and generates input events. In generating each selection input event, the input interface assigns to each input event a user ID, and a surface ID where the surface ID corresponds to the interactive surface associated with the respective IWB. In this embodiment, other devices such as, for example, slates and tablets, each having an interactive surface may be brought into communication with a host IWB, and may each be assigned a unique surface ID.

The application program may comprise program modules including routines, programs, object components, data structures, and the like, and may be embodied as computer readable program code stored on a non-transitory computer readable medium. The computer readable medium is any data storage device that can store data. Examples of computer readable media include for example read-only memory, random-access memory, CD-ROMs, magnetic tape, USB keys, flash drives and optical data storage devices. The computer readable program code can also be distributed over a network including coupled computer systems so that the computer readable program code is stored and executed in a distributed fashion.

In embodiments described above, the general purpose computing device distinguishes between different pointer types by differentiating the curve of growth of the pointer tip. However, in other embodiments, other approaches may be used to distinguish between different types of pointers, or even between different individual pointers of the same type, and to assign user IDs accordingly. For example, in other embodiments, active pen tools are used, each of which transmits a unique identity in the form of a pointer serial number or other suitable identifier to a receiver coupled to IWB 22 via visible or infrared (IR) light, electromagnetic signals, ultrasonic signals, or other suitable approaches. In a related embodiment, each pen tool comprises an IR light emitter at its tip that emits IR light modulated with a unique pattern. A user ID is then assigned to each pen tool according to its IR light pattern. Specifics of such pen tools configured to emit modulated light are disclosed in U.S. Patent Application Publication No. 2009/0278794 to McReynolds et al., assigned to SMART Technologies ULC, Calgary, Alberta, Canada, the assignee of the subject patent application, the content of which is incorporated herein in its entirety. Those skilled in the art will appreciate that other approaches are readily available to distinguish pointers, such as for example by differentiating between pen tools having distinct pointer shapes, or labeled with unique identifiers such as RFID tags, barcodes, color patterns on pen tip or pen body, and the like. As another example, if the user is wearing gloves having fingertips that are treated so as to be uniquely identifiable (e.g., having any of a unique shape, color, barcode, contact surface area, emission wavelength), then the individual finger contacts may be readily distinguished.

Although in embodiments described above, each selection is associated with a user ID based on both the surface ID and input ID (identifying the pointer type), in other embodiments, each selection may alternatively be directly associated with a user. For example, touch detecting technologies such as DiamondTouch™ available from Circle Twelve Inc. of Framingham, Mass., U.S.A., may be used to identify each user that operates an interactive whiteboard during multiple user applications.

In other embodiments, each selection may be made visually distinctive. For example, selections may be color coded in chronological order of creation. For example, a first created selection may be a semitransparent shade of red, a second selection yellow, a third selection green, etc.

In another embodiment, each user ID is assigned a particular color (e.g., green). Individual selections that are associated with the user ID may thus be assigned shades of the particular color assigned to the user (e.g., shades of green, for a user assigned the color green). This allows all users to learn which selections are associated with particular user IDs.

Technologies such as DiamondTouch™ transmit signals through antennas that are in electrical communication with the interactive surface of an IWB. The signals are capacitively coupled through both the users and the chairs on which they sit (or pads on which users stand, specialized slippers or shoes, electronic bracelets, etc.) to dedicated receivers. The receivers identify the coordinates of the touch surface each user is touching. This information can then be dealt with by the input interface 102 in a similar way as input received on the IWB. In this alternative embodiment, [selection ID, user ID] associations directly map each selection to a particular user (rather than to a particular input source). This allows each user to independently manipulate his/her own selection as described above, without relying on the particularities of the input source used. In a related embodiment, each identified user is assigned a particular color (e.g., green). Individual selections that are associated with that user may thus be assigned shades of the particular color assigned to the user (e.g., shades of green, for a user assigned the color green). This allows all users to learn which selections are associated with particular users.

In some embodiments, each selection may have a displayed label associated therewith. In other embodiments a legend indicating either user IDs or identified users, and their assigned colors, may optionally be displayed at a corner of the interactive surface. Of course, many variations of assigning colors to selections for conveying information related to chronology, ownership, size, and the like are possible. The color, border, line thickness, transparency, shape or other visual properties of a selection or objects contained therein may be varied to distinguish one selection from another.

In other embodiments, selections may alternatively be created with (and thus associated with or owned by) a virtual user ID. For example, in such alternative embodiments, a CTRL-A command (achieved by pressing both the 'CTRL' key and the 'A' key on a keyboard) creates a selection that includes all objects in an application window owned by the virtual user ID. In a related embodiment, selections owned by the virtual user ID may be cleared by the actions of any other input source. For example, a single-click or double-click event from a mouse on a clear area (workspace or drawing area) clears the selection owned by the virtual user ID. As will be understood, the ability to transfer ownership of selections allows enables any desired input source to own a selection containing all objects on application (created by pressing CTRL-A).

In still other embodiments, an input source (e.g., a mouse) may optionally be designated to be able to clear all selections including those associated with other user IDs. In a related embodiment, a 'clear all' command or button for all selections may be provided. For example, one or more designated input sources (e.g., a mouse) may be allowed to clear all selections by clicking a clear workspace area. In other embodiments, any selection tool may be allowed to clear all selections by right-clicking or double-clicking on a clear workspace. An exception may be made for selections that are actively being manipulated. Additionally, in some embodiments, certain inputs from any input source (e.g., a right-click) may clear all selections.

Although in embodiments described above, the application program is the SMART Notebook™, in other embodiments, the application program may alternatively be an operating system software, a drawing package, a web browser, a word processor, a dialog window, a graphic container or a graphical user interface forming part of another software application.

Although in embodiments described above, the graphic objects include shape objects, digital ink objects, and text objects, in other embodiments, the graphic objects may alternatively include other graphic objects, such as animation objects such as a Flash™ object or a movie clip.

Although embodiments have been described above with reference to the accompanying drawings, those of skill in the art will appreciate that variations and modifications may be made without departing from the scope thereof as defined by the appended claims.

What is claimed is:
1. A method comprising:
receiving an input event associated with a first user identification (ID), the input event being a command for creating a first selection set that is to comprise at least one selected existing graphic object presented on a display surface;
determining if a selection set is currently associated with the first user ID;
if no selection set is currently associated with the first user ID:
creating the first selection set having a first selection set ID;
associating the first selection set ID with the first user ID; and
including the at least one selected existing graphic object in the first selection set by associating the object ID of the at least one selected existing graphic object with the first selection set ID without moving said at least one selected existing graphic object;
including a plurality of selected existing graphic objects in the first selection set; and
wherein said input event is one of an input enclosure that surrounds said plurality of selected existing graphic objects or an input gesture that encompasses said plurality of selected existing graphic objects.

2. A method according to claim 1, further comprising:
receiving an input event associated with a second user ID, the input event being a command for creating a second selection set that is to comprise at least one other selected existing graphic object presented on said display surface;
determining if a selection set is currently associated with the second user ID; and
if no selection set is currently associated with the second user ID:
creating the second selection having a second selection set ID;
associating the second selection set ID with the second user ID; and
including the at least one other selected existing graphic object in the second selection set by associating the object ID of the at least one other selected existing graphic object with the second selection set ID without moving said at least one other selected existing graphic object.

3. A method according to claim 2, wherein each of the first and second selection sets is manipulatable only by an input source associated with the first and second user IDs, respectively.

4. A method according to claim 3, wherein each of the first and second selection sets is manipulatable via one of resizing, moving and rotating the first and second selection sets.

5. A method according to claim 2, further comprising:
altering visual properties of the at least one selected existing graphic object and the at least one other selected existing graphic object in the first and second selection sets, respectively, for indicating membership in each respective selection set, the altered visual properties of the at least one selected existing graphic object and the at least one other selected existing graphic object in the first and second selection sets, respectively, being different.

6. The method of claim 2, wherein said including steps comprise including a plurality of selected existing graphic objects in the first selection set and including a plurality of other selected existing graphic objects in the second selection set.

7. The method of claim 6, wherein said input event associated with said first user ID is one of an input enclosure that surrounds said plurality of selected existing graphic objects or an input gesture that encompasses said plurality of selected existing graphic objects and wherein said input event associated with said second user ID is one of an input enclosure that surrounds said plurality of other selected existing graphic objects or an input gesture that encompasses said plurality of other selected existing graphic objects.

8. The method of claim 2, wherein said first and second selection sets are created simultaneously.

9. A method according to claim 1, further comprising:
if an existing selection set is currently associated with the first user ID:
clearing the existing selection set;
creating the new selection set; and
including the at least one selected existing graphic object in the new selection set.

10. A method according to claim 1, wherein the first selection set is manipulatable only by an input source associated with the first user ID.

11. A method according to claim 10, wherein the first selection set is manipulatable via one of resizing, moving and rotating the first selection set.

12. A method according to claim 1, wherein the at least one selected existing graphic object is one of a shape object, a text object, an ink object, and an animation object.

13. A method according to claim 1, wherein said first user ID is based on an input ID and a display surface ID.

14. A method according to claim 1, further comprising:
altering a visual property of the at least one selected existing graphic object to indicate membership in the first selection set.

15. The method of claim 1, further comprising transferring the association of the first selection set ID from the first user ID to another user ID.

16. The method of claim 1, wherein said input enclosure is a bounding box that has been expanded to surround said plurality of selected existing graphic objects or drawn shape that surrounds said plurality of selected existing graphic objects.

17. An interactive input system comprising:
at least one interactive surface; and
processing structure in communication with the interactive surface and being configured to:
generate an input event associated with a first user ID, the input event being a command for creating a first selection set that is to comprise at least one selected existing graphic object presented on said at least one interactive surface;
determine if a selection set is currently associated with the first user ID;
if no selection set is currently associated with the first user ID:
create the first selection having a first selection set ID;
associate the first selection set ID with the first user ID; and
include the at least one selected existing graphic object shown on the interactive surface in the first selection by associating the object ID of the at least one selected existing graphic object with the first selection set ID without moving said at least one selected existing graphic object;
include a plurality of selected existing graphic objects in the first selection set; and
wherein said input event is one of an input enclosure that surrounds said plurality of selected existing graphic objects or an input gesture that encompasses said plurality of selected existing graphic objects.

18. An interactive input system according to claim 17, wherein the processing structure is further configured to:
generate an input event associated with a second user ID, the input event being a command for creating a second selection set that is to comprise at least one other selected existing graphic object presented on said at least one interactive surface;
determine if a selection set is currently associated with the second user ID; and
if no selection set is currently associated with the second user ID:
create the second selection having a second selection set ID;
associate the second selection set ID with the second user ID; and
include the at least one other selected existing graphic object in the second selection set by associating the object ID of the at least one other selected existing graphic object with the second selection set ID without moving said at least one other selected existing graphic object.

19. An interactive input system according to claim 18, wherein each of the first and second selection sets is manipulatable only by an input source associated with the first and second user IDs, respectively.

20. An interactive input system according to claim 19, wherein each of the first and second selection sets is manipulatable via one of resizing, moving and rotating the first and second selection sets.

21. An interactive input system according to claim 18, wherein the processing structure is further configured to:
 alter visual properties of the at least one selected existing graphic object and the at least one other selected existing graphic object in the first and second selection sets for indicating membership in each respective selection set, the altered visual properties of the at least one selected existing graphic object and the at least one other selected existing graphic object in the first and second selection sets being different.

22. An interactive input system according to claim 17, wherein the processing structure is further configured to:
 if an existing selection set is currently associated with the first user ID:
  clear the existing selection set;
  create the new selection set; and
  include the at least one selected existing graphic object in the new selection set.

23. An interactive input system according to claim 17, wherein the first selection set is manipulatable only by an input source associated with the first user ID.

24. An interactive input system according to claim 23, wherein the first selection set is manipulatable via one of resizing, moving and rotating the first selection set.

25. An interactive input system according to claim 17, wherein the at least one selected existing graphic object is one of a shape object, a text object, an ink object, and an animation object.

26. An interactive input system according to claim 17, wherein said first user ID is based on an input ID and an interactive surface ID.

27. An interactive input system according to claim 17, wherein the processing structure is further configured to:
 alter a visual property of the at least one selected existing graphic object to indicate membership in the first selection set.

28. A non-transitory computer-readable medium having embodied thereon a computer program comprising instructions which, when executed by processing structure, carry out the steps of:
 receiving an input event associated with a first user ID, the input event being a command for creating a first selection set that is to comprise at least one selected existing graphic object presented on a display surface;
 determining if a selection set is currently associated with the first user ID;
 if no selection set is currently associated with the first user ID:
  creating the first selection set having a first selection set ID;
  associating the first selection set ID with the first user ID; and
  including the at least one selected existing graphic object in the first selection set by associating the object ID of the at least one selected existing graphic object with the first selection set ID without moving said at least one selected existing graphic object;
 including a plurality of selected existing graphic objects in the first selection set; and
 wherein said input event is one of an input enclosure that surrounds said plurality of selected existing graphic objects or an input gesture that encompasses said plurality of selected existing graphic objects.

29. An apparatus comprising:
 processing structure; and
 memory storing program code, which when executed by the processing structure, causes the processing structure to direct the apparatus at least to:
 in response to receiving an input event associated with a first user ID, the input event being a command for creating a first selection set that is to comprise at least one selected existing graphic object presented on a display surface, determine if a selection set is currently associated with the first user ID;
 if no selection set is currently associated with the first user ID:
  create the first selection having a first selection set ID;
  associate the first selection set ID with the first user ID; and
  include the at least one selected existing graphic object in the first selection set by associating the object ID of the at least one selected existing graphic object with the first selection set ID without moving said at least one selected existing graphic object;
 include a plurality of selected existing graphic objects in the first selection set; and
 wherein said input event is one of an input enclosure that surrounds said plurality of selected existing graphic objects or an input gesture that encompasses said plurality of selected existing graphic objects.

30. An apparatus according to claim 29, where in response receiving an input event associated with a second user ID, the input event being a command for creating a second selection set that is to comprise at least one other selected existing graphic object presented on said display surface, the program code further causes the processing structure to direct the apparatus to:
 create the second selection set having a second selection set ID;
 associate the second selection set ID with the second user ID; and
 include the at least one other selected existing graphic object in the second selection set by associating the object ID of the at least one other selected existing graphic object with the second selection set ID without moving the at least one other selected existing graphic object.

31. An apparatus according to claim 30, wherein each of the first and second selection sets is manipulatable only by an input source associated with the first and second user IDs, respectively.

32. An apparatus according to claim 31, wherein each of the first and second selection sets is manipulatable via one of resizing, moving and rotating the first and second selection sets.

33. An apparatus according to claim 30, wherein execution of the program code by the processing structure further causes the processing structure to direct the apparatus to:
 alter visual properties of the at least one selected existing graphic object and the at least one other selected existing graphic object in the first and second selection sets, respectively, for indicating membership in each respective selection set, the altered visual properties of the at least one selected existing graphic object and the at least one other selected existing graphic object in the first and second selection sets, respectively, being different.

34. An apparatus according to claim 30, wherein said program code causes the processing structure to direct the apparatus to include a plurality of selected existing graphic objects in the first selection set and causes the processing structure to direct the apparatus to include a plurality of other selected existing graphic objects in the second selection set.

35. The apparatus of claim 34, wherein said input event associated with said first user ID is one of an input enclosure that surrounds said plurality of selected existing graphic objects or an input gesture that encompasses said plurality of selected existing graphic objects and wherein said input event associated with said second user ID is one of an input enclosure that surrounds said plurality of other selected existing graphic objects or an input gesture that encompasses said plurality of other selected existing graphic objects.

36. An apparatus according to claim 30, wherein said program code causes the processing structure to direct the apparatus to create the first and second selection sets simultaneously.

37. An apparatus according to claim 29, wherein execution of the program code by the processing structure further causes the processing structure to direct the apparatus to:
  if an existing selection set is currently associated with the first user ID:
    clear the existing selection set;
    create the new selection set; and
    include the at least one selected existing graphic object in the new selection set.

38. An apparatus according to claim 29, wherein the first selection set is manipulatable only by an input source associated with the first user ID.

39. An apparatus according to claim 38, wherein the first selection set is manipulatable via one of resizing, moving and rotating the first selection set.

40. An apparatus according to claim 29, wherein the at least one selected graphic object is one of a shape object, a text object, an ink object, and an animation object.

41. An apparatus according to claim 29, wherein said first user ID is based on an input ID and a display surface ID.

42. An apparatus according to claim 29, wherein execution of the program code by the processing structure further causes the processing structure to direct the apparatus to:
  alter a visual property of the at least one selected existing graphic object to indicate membership in the first selection set.

43. An apparatus according to claim 30, wherein the program code further causes the processing structure to direct the apparatus to transfer the association of the first selection set ID from the first user ID to another user ID.

44. The apparatus of claim 29, wherein said input enclosure is a bounding box that has been expanded to surround said plurality of selected existing graphic objects or drawn shape that surrounds said plurality of selected existing graphic objects.

* * * * *